(12) United States Patent
Mizuma et al.

(10) Patent No.: US 11,056,106 B2
(45) Date of Patent: Jul. 6, 2021

(54) VOICE INTERACTION SYSTEM AND INFORMATION PROCESSING APPARATUS

(71) Applicant: TOYOTA JIDOSHA KABUSHIKI KAISHA, Toyota (JP)

(72) Inventors: Satoshi Mizuma, Urayasu (JP); Atsushi Ikeno, Kyoto (JP); Hiroshi Yamaguchi, Azumino (JP); Yuta Yamamoto, Azumino (JP); Toshifumi Nishijima, Kasugai (JP); Satoru Sasaki, Gotemba (JP); Hiromi Tonegawa, Okazaki (JP); Norihide Umeyama, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 15/957,352

(22) Filed: Apr. 19, 2018

(65) Prior Publication Data
US 2018/0315423 A1   Nov. 1, 2018

(30) Foreign Application Priority Data

Apr. 27, 2017   (JP) .............................. JP2017-088728

(51) Int. Cl.
*G10L 15/00*   (2013.01)
*G10L 15/04*   (2013.01)
(Continued)

(52) U.S. Cl.
CPC .............. *G10L 15/22* (2013.01); *G06F 3/167* (2013.01); *G10L 15/30* (2013.01);
(Continued)

(58) Field of Classification Search
CPC ........... H04L 67/125; H04L 2012/2841; H04L 2209/80; H04L 51/046; H04L 67/18;
(Continued)

(56) References Cited

U.S. PATENT DOCUMENTS

| 8,589,161 | B2 * | 11/2013 | Kennewick | G10L 15/22 |
| | | | | 704/252 |
| 2005/0192810 | A1 * | 9/2005 | Konig | B60R 16/0373 |
| | | | | 704/275 |

(Continued)

FOREIGN PATENT DOCUMENTS

| CN | 102026322 A | 4/2011 |
| JP | 2013-055545 A | 3/2013 |

(Continued)

*Primary Examiner* — Michael Ortiz-Sanchez
(74) *Attorney, Agent, or Firm* — Oliff PLC

(57) ABSTRACT

A system comprises an apparatus having a first voice I/O device; and a voice interface apparatus having a second voice I/O device, and connected to the apparatus by audio connection via short-range wireless communication, wherein the apparatus includes a voice I/O unit that performs voice input and output by using the first voice I/O device or the second voice I/O device; an interaction unit that performs voice interaction with a user; and a process unit that performs a process other than the voice interaction, by using the voice I/O, and the voice I/O unit switches a device used for the voice input and output to the first voice input/output device in a case where the process unit is brought into a first state in which the voice input and output is required when the voice interaction with the user is performed by using the second voice I/O device.

10 Claims, 6 Drawing Sheets

(51) Int. Cl.
*G10L 15/22* (2006.01)
*G10L 15/30* (2013.01)
*H04M 1/60* (2006.01)
*G06F 3/16* (2006.01)
*H04M 1/72412* (2021.01)
*H04M 1/72415* (2021.01)
*G10L 15/28* (2013.01)

(52) U.S. Cl.
CPC ..... *H04M 1/6041* (2013.01); *H04M 1/72412* (2021.01); *H04M 1/72415* (2021.01); *G10L 15/28* (2013.01); *G10L 2015/223* (2013.01); *H04M 2250/74* (2013.01)

(58) Field of Classification Search
CPC .............. H04L 67/26; H04N 21/42204; H04N 21/43615; H04N 21/482; H04N 21/485; H04N 2007/145; H04N 7/147; H04N 21/42203; H04N 21/439; G06F 9/453; G06F 3/167; G06F 1/1605; G06F 1/1698; G06F 1/3206; G06F 21/85; G06F 3/14; G10L 15/22; G10L 2015/223; G10L 25/48; H04W 4/44; H04W 4/70; H04W 4/40; H04W 84/12; H04W 88/02; H04W 4/16; H04W 4/18; H04W 8/005; H04W 4/00; H04W 4/48; H04W 88/06; H04W 88/04; H04W 12/003; H04W 36/36; H04M 2207/18; H04M 2201/40; H04M 1/7253; H04M 3/4288; H04M 3/58; H04M 1/6041; H04M 3/567; H04M 7/0033

See application file for complete search history.

(56) References Cited

U.S. PATENT DOCUMENTS

| | | | |
|---|---|---|---|
| 2006/0173689 A1* | 8/2006 | Hataoka | G01C 21/3608 704/275 |
| 2012/0052920 A1* | 3/2012 | Kobayashi | H04M 1/72519 455/566 |
| 2014/0018056 A1 | 1/2014 | Miyake et al. | |
| 2014/0122726 A1* | 5/2014 | Jafry | H04L 65/4015 709/227 |
| 2015/0006166 A1* | 1/2015 | Schmidt | G10L 15/30 704/231 |
| 2015/0172452 A1* | 6/2015 | Kobayashi | H04M 1/6041 455/414.1 |
| 2016/0127559 A1* | 5/2016 | Baek | H04M 3/543 455/417 |
| 2017/0237986 A1* | 8/2017 | Choi | H04W 4/80 348/14.02 |
| 2018/0288214 A1* | 10/2018 | Lv | H04M 1/6066 |

FOREIGN PATENT DOCUMENTS

| | | |
|---|---|---|
| JP | 2015-013351 A | 1/2015 |
| JP | 2015-128297 A | 7/2015 |

* cited by examiner

VOICE INTERACTION SYSTEM AND INFORMATION PROCESSING APPARATUS

CROSS REFERENCE TO RELATED APPLICATION

This application claims the benefit of Japanese Patent Application No. 2017-088728, filed on Apr. 27, 2017, which is hereby incorporated by reference herein in its entirety.

BACKGROUND OF THE INVENTION

Field of the Invention

The present invention relates to an apparatus that interacts with a person by voice.

Description of the Related Art

In recent years, a robot for providing various pieces of information by interacting with a person is developed. For example, Japanese Patent Application Publication No. 2015-013351 discloses a communication robot that processes, on a network, a voice input with a microphone and responds to the input by voice.

As in a system described in Japanese Patent Application Publication No. 2015-013351, in the field of the communication robot, in order to reduce cost, it is common to adopt a configuration in which a robot serving as an interface performs wireless communication with a control apparatus (a portable computer such as a smart phone and the like), and voice recognition and response generation are performed on the side of the control apparatus.

SUMMARY OF THE INVENTION

In the case where the smart phone or the like is used as the control apparatus of the communication robot, a process in the case where a call arrives during voice interaction becomes a problem. For example, when the call is answered in a state in which the robot and the smart phone are connected to each other by audio connection, the voice of the caller is output from the robot and, as a result, a user feels uncomfortable.

That is, it is necessary to appropriately switch between voice input and output performed in the phone and voice input and output performed by using the robot.

The present invention has been made in view of the above problem, and an object thereof is to appropriately switch a voice input/output device in a voice interaction system in which a robot and a control apparatus are wirelessly connected to each other.

The present invention in its one aspect provides a voice interaction system comprising an information processing apparatus having a first voice input/output device; and a voice interface apparatus having a second voice input/output device, and connected to the information processing apparatus by audio connection via short-range wireless communication, wherein the information processing apparatus includes a voice input/output unit configured to perform voice input and output by using the first voice input/output device or the second voice input/output device; an interaction unit configured to perform voice interaction with a user; and a process unit configured to perform a process other than the voice interaction, by using the voice input and output, and the voice input/output unit switches a device used for the voice input and output to the first voice input/output device in a case where the process unit is brought into a first state in which the voice input and output is required when the voice interaction with the user is performed by using the second voice input/output device.

The voice interface apparatus according to the present invention is an interaction interface that performs the interaction with the user by communicating with the information processing apparatus. The information processing apparatus is an apparatus that controls the interaction with the user (an apparatus that performs, e.g., voice recognition, response sentence generation, and voice synthesis), and is typically a portable computer such as a smart phone. Each of the voice interface apparatus and the information processing apparatus includes the voice input/output device.

The voice input/output unit of the information processing apparatus can select, as the device that performs the voice input and output, the first voice input/output device of the information processing apparatus or the second voice input/output device of the voice interface apparatus. In the case where the second voice input/output device is selected, a voice is transmitted via audio connection by the short-range wireless communication.

The process unit is the unit that performs the process other than the voice interaction by using the voice input and output. The process unit may be, e.g., the unit that performs a voice call, and may also be the unit that executes another application (e.g., a telephone application).

In addition, in the present invention, in the case where the process unit is brought into the state in which the voice input and output is required when the voice interaction is performed by using the second voice input/output device (e.g., the case where a voice call arrives at a telephone or call application), the device used for the voice input and output is switched to the first voice input/output device.

According to the configuration described above, it becomes possible for the information processing apparatus to use the voice interface apparatus connected to the information processing apparatus via the short-range wireless communication in the state in which the interaction with the user is performed, and disconnect the voice interface apparatus and respond to a call when the call arrives.

Further, the process unit may be a unit for performing a voice call via a wireless communication network.

The present invention can be suitably applied to a mode in which the information processing apparatus performs both of the voice interaction and the voice call.

Further, the information processing apparatus and the voice interface apparatus may be connected to each other by using a voice profile based on a Bluetooth standard.

The information processing apparatus and the voice interface apparatus perform the short-range communication in a state in which they are paired with each other, and hence a connection based on Bluetooth is suitable. In addition, the advantage is achieved that it is possible to use the smart phone or the like as the information processing apparatus, and reduce power consumption. Further, by using the voice profile, communication with little delay is allowed.

Further, the process unit may transmit a first notification to the voice interface apparatus in the case where the process unit is brought into the first state, and the voice interface apparatus may terminate the audio connection with the information processing apparatus in a case where the voice interface apparatus receives the first notification.

In the case where the connection is established based on Bluetooth and the process unit is brought into the first state, it is possible to terminate the audio connection by transmitting information indicative of the first state to the voice interface apparatus.

Further, the process unit may transmit a second notification to the voice interface apparatus in a case where the voice input and output becomes unnecessary, and the voice interface apparatus may re-establish the audio connection with the information processing apparatus in a case where the voice interface apparatus receives the second notification.

For example, in the case where the voice input and output becomes unnecessary on the side of the process unit such as the case where a call is ended, the voice interface apparatus cannot detect this. To cope with this, the notification can be transmitted from the side of the information processing apparatus such that the audio connection is re-established from the side of the voice interface apparatus.

Further, the process unit may transmit a first notification to the voice interface apparatus in the case where the process unit is brought into the first state, and the voice interface apparatus may transmit a rejection response to the process unit, and then terminates the audio connection with the information processing apparatus in a case where the voice interface apparatus receives the first notification.

Further, when the process unit receives the rejection response and the audio connection is terminated, the process unit may re-establish the audio connection by transmitting a second notification to the voice interface apparatus in a case where the voice input and output becomes unnecessary.

By transmitting the rejection response before terminating the audio connection, it is possible to notify the side of the information processing apparatus that "the audio connection has been terminated due to the information processing apparatus". With this, the information processing apparatus can recognize the necessity to re-establish the connection.

The present invention in its another aspect provides an information processing apparatus comprising a first voice input/output device; a voice input/output unit configured to perform voice input and output by using the first voice input/output device or a second voice input/output device of a voice interface apparatus connected to the information processing apparatus via short-range wireless communication; an interaction unit configured to perform voice interaction with a user; and a process unit configured to perform a process other than the voice interaction, by using the voice input and output, wherein the voice input/output unit switches a device used for the voice input and output to the first voice input/output device in a case where the process unit is brought into a first state in which the voice input and output is required when the voice interaction with the user is performed by using the second voice input/output device.

Note that the present invention can be viewed as a voice interaction system or an information processing apparatus that includes at least part of the above units. In addition, the present invention can also be viewed as a voice interaction method performed by the voice interaction system or an information processing method performed by the information processing apparatus. The above processes and units can be arbitrarily combined and implemented as long as no technical conflicts occur.

According to the present invention, it is possible to appropriately switch the voice input/output device in the voice interaction system in which the robot and the control apparatus are wirelessly connected to each other.

DESCRIPTION OF THE EMBODIMENTS

Hereinbelow, preferred embodiments of the present invention will be described with reference to the drawings.

A voice interaction system according to the present embodiment is a system in which interaction with a user is performed by acquiring a voice uttered by the user and performing voice recognition, and generating a response sentence based on the result of the recognition.

First Embodiment

Figure 1:
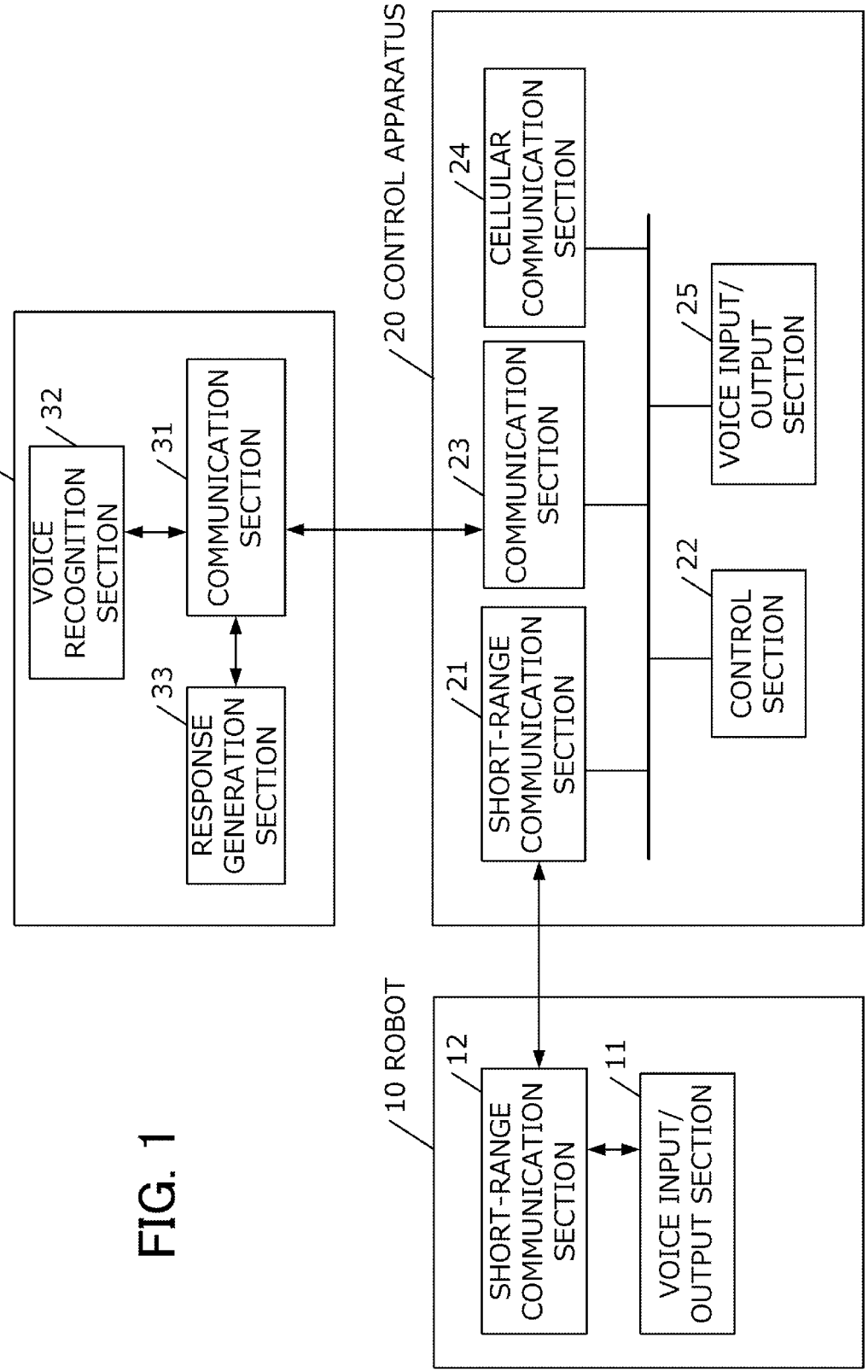
FIG. 1 is a system configuration diagram of a voice interaction system according to a first embodiment.

FIG. 1 is a system configuration diagram of the voice interaction system according to a first embodiment. The voice interaction system according to the present embodiment includes a robot 10, a control apparatus 20, and a server apparatus 30.

The robot 10 has a speaker and a microphone, and is a unit configured to serve as an interface with a user. The robot 10 may be a humanoid robot or a character-type robot, or may have other shapes.

The control apparatus 20 is an apparatus that controls the interaction with the user performed via the robot 10. The server apparatus 30 is an apparatus that performs voice recognition and generation of a response (response sentence) provided to the user in accordance with a request transmitted from the control apparatus 20. In the present embodiment, the control apparatus 20 is a smart phone having a call function.

In the present embodiment, the robot 10 functions only as a voice interface, and a process for controlling the interaction is performed by the control apparatus 20. The recognition of an utterance content and the generation of the response sentence are performed by the server apparatus 30.

The robot 10 will be described first. The robot 10 includes a voice input/output section 11 and a short-range communication section 12.

The voice input/output section 11 is a unit configured to acquire a voice uttered by the user and play back a voice transmitted from the control apparatus 20. Specifically, the voice input/output section 11 converts the voice to an electrical signal (hereinafter referred to as voice data) by using an integrated microphone. The acquired voice data is transmitted to the control apparatus 20 via the short-range communication section 12 described later. In addition, the voice input/output section 11 converts the voice data transmitted from the control apparatus 20 to the voice by using an integrated speaker.

The short-range communication section 12 is a unit configured to perform short-range wireless communication with the control apparatus 20. In the present embodiment, the short-range communication section 12 performs the communication by using a Bluetooth (registered trademark) standard. The short-range communication section 12 stores information related to the control apparatus 20 with which the short-range communication section 12 is to be paired, and can perform connection by a simple process. Note that the Bluetooth standard is also referred to as IEEE802.15.1.

Next, the control apparatus 20 will be described. The control apparatus 20 is an apparatus that performs control of the robot 10, and is typically a small computer such as a mobile computer, a mobile phone, or a smart phone. The control apparatus 20 can be configured as an information processing apparatus having a CPU, a main storage apparatus, and an auxiliary storage apparatus. A program stored in the auxiliary storage apparatus is loaded into the main storage apparatus and the program is executed by the CPU, and the individual units shown in FIG. 1 thereby function. Note that all or part of the functions shown in the drawing may be executed by using an exclusively designed circuit.

The control apparatus 20 includes a short-range communication section 21, a control section 22, a communication section 23, a cellular communication section 24, and a voice input/output section 25.

The functions of the short-range communication section 21 are the same as those of the short-range communication section 12 described above, and hence the detailed description thereof will be omitted.

The control section 22 is a unit configured to acquire a voice from the robot 10 and acquire a response to the acquired voice. Specifically, the control section 22 transmits the voice acquired from the robot 10 to the server apparatus 30 via the communication section 23 (they will be described later), and receives the corresponding response sentence from the server apparatus 30. In addition, the control section 22 converts the response sentence to the voice data by a voice synthesis function, and transmits the voice data to the robot 10. The voice transmitted to the robot 10 is provided to the user via the voice input/output section 11. With this, the user can perform interaction based on natural language.

In addition, the control section 22 is also a unit configured to control a voice call. For example, the control section 22 connects to a cellular network via the cellular communication section 24 described later to make and receive a call.

The communication section 23 is a unit configured to communicate with the server apparatus 30 by accessing a network via a communications network (e.g., a wireless LAN or a mobile telephone network).

The cellular communication section 24 is a unit configured to communicate with the mobile telephone network. The cellular communication section 24 performs communication by using, e.g., a voice communication system of the third generation (3G), but the cellular communication section 24 may use a communication system other than the above communication system. For example, the cellular communication section 24 may perform communication via a data communication system of the fourth or higher generation (LTE or the like).

Similarly to the voice input/output section 11, the voice input/output section 25 is a unit configured to acquire the voice uttered by the user and output the voice. The voice input/output section 25 may be a speaker and a microphone integrated in the smart phone.

The server apparatus 30 is an apparatus that recognizes the voice transmitted from the control apparatus 20, and then generates the response sentence provided to the user, and includes a communication section 31, a voice recognition section 32, and a response generation section 33.

The functions of the communication section 31 are the same as those of the communication section 23 described above, and hence the detailed description thereof will be omitted.

The voice recognition section 32 is a unit configured to perform voice recognition on the voice acquired by the voice input/output section 11 of the robot, and convert the voice to text. The voice recognition can be performed by known techniques. For example, an acoustic model and a recognition dictionary are stored in the voice recognition section 32, and the voice recognition section 32 compares the acquired voice data with the acoustic model to extract a feature, and performs the voice recognition by matching the extracted feature with the recognition dictionary. The result of the recognition is transmitted to the response generation section 33.

The response generation section 33 is a unit configured to generate the response sentence provided to the user based on the text acquired from the voice recognition section 32. The response sentence to be provided may be the response sentence based on a pre-stored interaction scenario (interaction dictionary), or may also be the response sentence based on information obtained by searching a database or the web. The details of the process will be described later.

Information acquired by the response generation section 33 is transmitted in text form to the control apparatus 20 and thereafter, the information is converted to a synthesized voice, and the synthesized voice is output toward the user via the robot 10.

The server apparatus 30 can also be configured as an information processing apparatus having a CPU, a main storage apparatus, and an auxiliary storage apparatus. A program stored in the auxiliary storage apparatus is loaded into the main storage apparatus and the program is executed by the CPU, and the individual units shown in FIG. 1 thereby function. Note that all or part of the functions shown in the drawing may be executed by using an exclusively designed circuit.

Next, a description will be given of a transmission/reception method of information between the robot 10 and the control apparatus 20. Between the robot 10 and the control apparatus 20, two types of pieces of data of (1) the voice data transmitted to the control apparatus from the robot and (2) the voice data transmitted to the robot from the control apparatus are transmitted and received.

In the present embodiment, audio connection between the robot 10 and control apparatus 20 that uses Bluetooth is performed, and the transmission and reception of the voice are performed.

Figure 2:
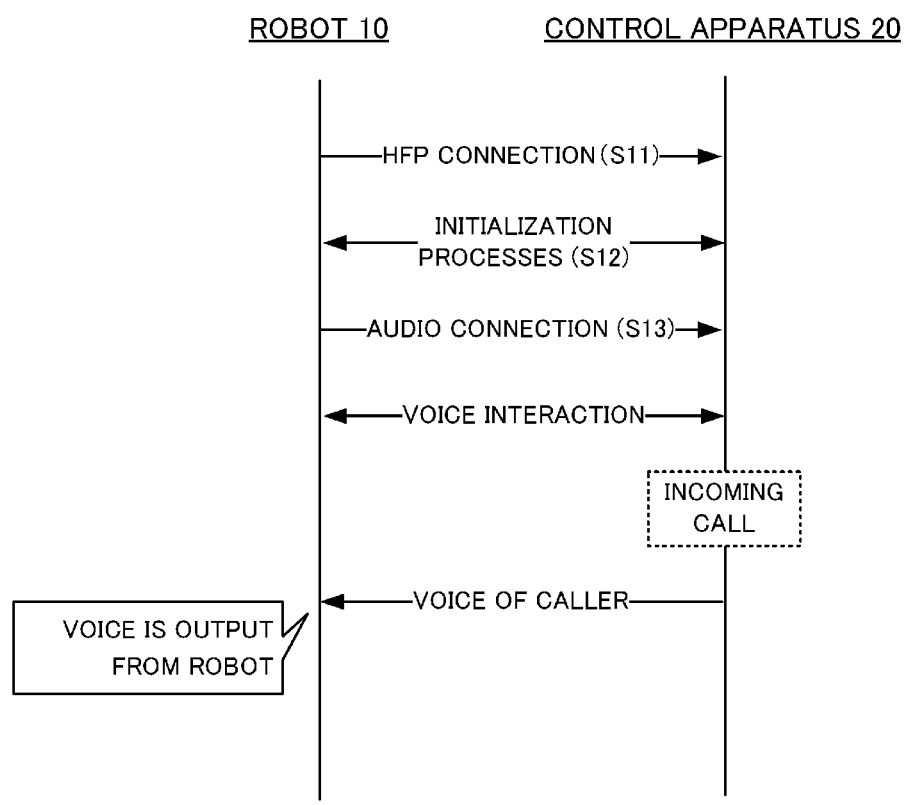
FIG. 2 is a diagram for explaining a connection between a robot 10 and a control apparatus 20.

FIG. 2 is an example of a connection sequence of the robot 10 and the control apparatus 20. Note that, in the present example, it is assumed that the robot 10 has information on the control apparatus 20 to which the robot 10 is to be connected. That is, it is assumed that pairing is completed.

In the case where the connection between the robot 10 and the control apparatus 20 is not established, the robot 10 periodically (e.g., at intervals of 1 second) searches for the control apparatus 20 and, when the robot 10 finds the control apparatus 20, the robot 10 starts connection based on Hands-Free Profile (HFP) (Step S11). HFP is a profile specializing in voice transmission, and bidirectional voice transmission is allowed by using this. Note that, in the present embodiment, the robot 10 corresponds to a hands-free unit in HFP, and the control apparatus 20 corresponds to an audio gateway.

When a connection request is received by the control apparatus 20, various initialization processes are executed (Step S12). In this step, setting of a noise reduction function (NREC), setting of speaker volume (VGS), and setting of microphone gain (VGM) are performed. Note that it takes a little time to complete the initialization processes based on HFP, and hence the robot 10 and the control apparatus 20 may perform other processes in parallel. When the connection based on HFP is completed, audio connection for providing a channel over which the voice is actually transmitted is performed (Step S13). With this, a voice channel between the robot 10 and the control apparatus 20 is opened.

Herein, a problem arises in that the control apparatus 20 is performing voice input and output by using the voice input/output section of the robot 10, and hence, when an incoming call arrives, the voice is sounded from the robot 10. For example, when the incoming call is answered in a state in which the audio connection between the robot and the smart phone is established, the voice of the caller is output from the robot and, as a result, a user feels uncomfortable.

In order to solve this problem, in the first embodiment, when the call arrives, the control section 22 terminates the audio connection between the robot 10 and the control apparatus 20, and re-establishes the audio connection between the robot 10 and the control apparatus 20 after the call is ended.

Figure 3:
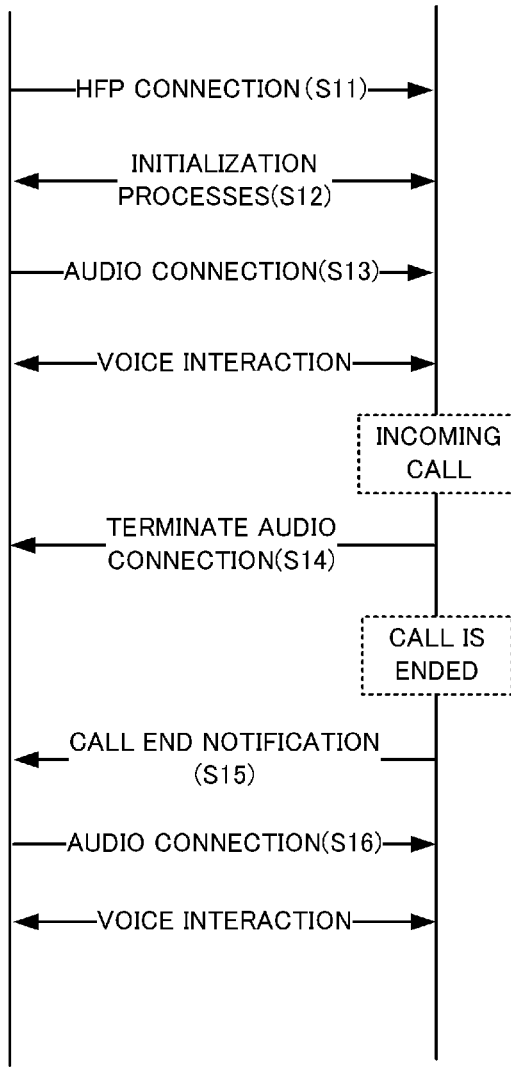
FIG. 3 is a diagram for explaining a connection procedure in the first embodiment.

FIG. 3 is a connection sequence diagram of the robot 10 and the control apparatus 20 in the first embodiment. As shown in the diagram, in the present embodiment, in the case where the control apparatus 20 receives an incoming call, the audio connection performed in Step S13 is terminated (Step S14). With this, the voice input and output having been performed via the voice input/output section 11 is performed via the voice input/output section 25. That is, a telephone conversation is allowed by using the speaker and the microphone of the smart phone.

When the call is ended, the control section 22 transmits a call end notification (a second notification in the present invention) to the robot 10 (Step S15), and the robot 10 having detected the call end notification performs the audio connection again (Step S16).

Figure 4:
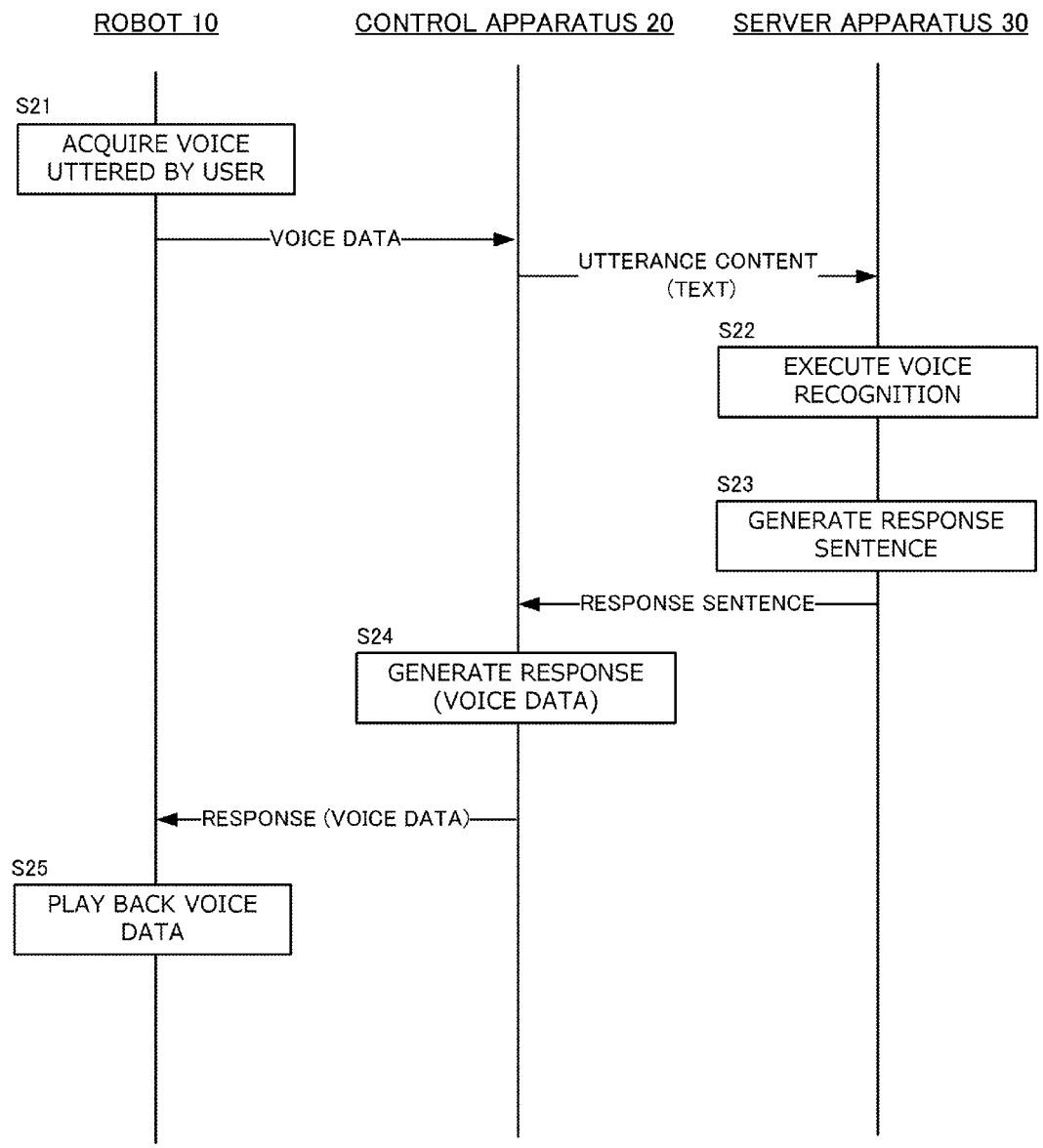
FIG. 4 is a diagram of a data flow among the robot 10, the control apparatus 20, and a server apparatus 30.

Next, a voice interaction process will be described with reference to FIG. 4 serving as a flowchart for explaining the details of the process and the flow of data.

First, in Step S21, the voice input/output section 11 of the robot 10 acquires the voice uttered by the user through the microphone. The acquired voice is converted to the voice data, and the voice data is transmitted to the control section 22 of the control apparatus 20 via the communication section. The control section 22 transmits the acquired voice data to the voice recognition section 32 of the server apparatus 30.

Next, the voice recognition section 32 performs the voice recognition on the acquired voice data, and converts the voice data to the text (Step S22). The text obtained as the result of the voice recognition is transmitted to the response generation section 33. Next, the response generation section 33 generates the response based on the content of the utterance obtained from the user (Step S23).

As described above, the response sentence may be generated by using the interaction dictionary (interaction scenario) of the server apparatus 30, and may also be generated by using an external information source (a database server or a web server). The generated response sentence is transmitted to the control apparatus 20, and is converted to the voice data by the control section 22 (Step S24). The voice data is transmitted to the robot 10, and playback of the voice data is performed (Step S25).

As described thus far, in the case where the incoming call arrives in the state in which the audio connection with the robot 10 is established, the control apparatus 20 according to the present embodiment terminates the audio connection, and causes the robot 10 to re-establish the audio connection after the call is ended by transmitting the call end notification.

According to the configuration described above, in the case where the call arrives during the voice interaction with the user, it is possible to prevent the voice of the caller from being output from the robot.

Second Embodiment

Figure 5:
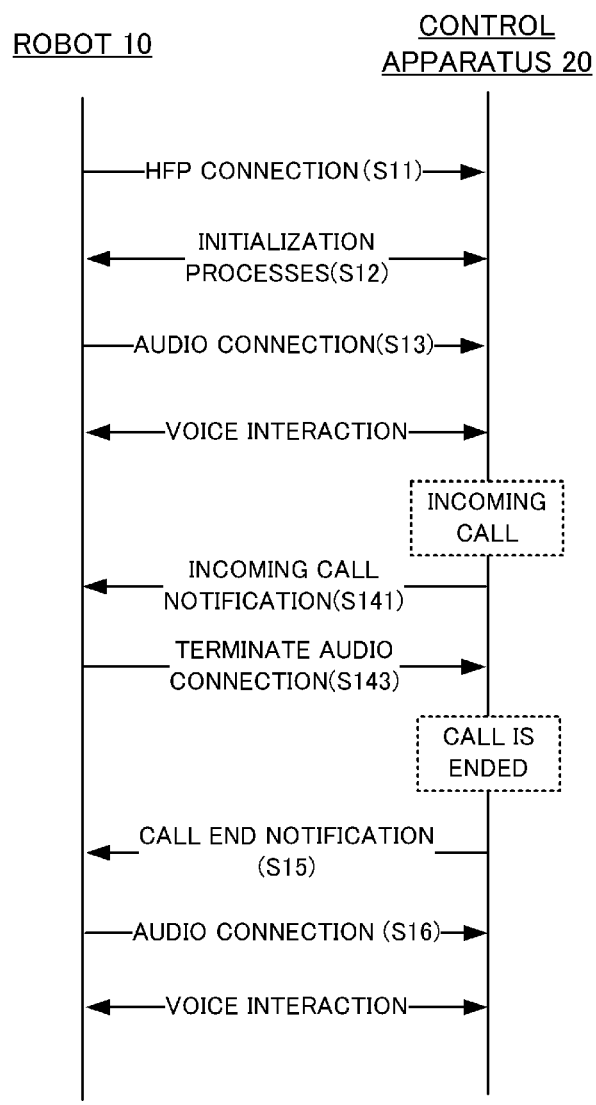
FIG. 5 is a diagram for explaining the connection procedure in a second embodiment.
Figure 6:
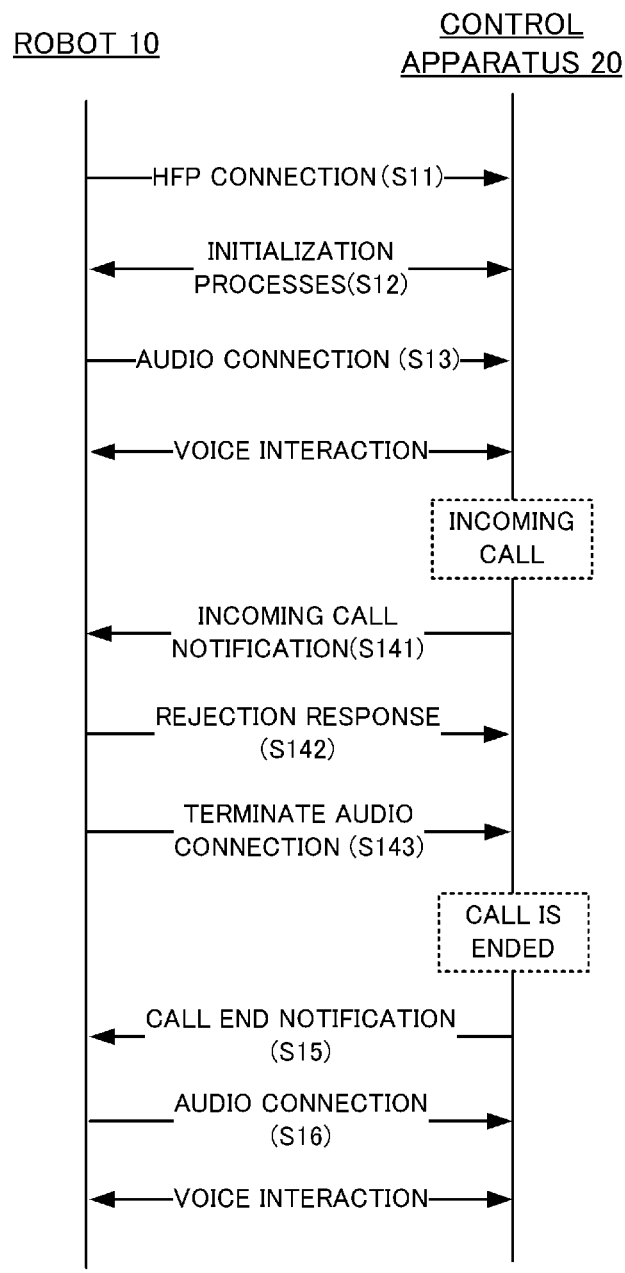
FIG. 6 is a diagram for explaining the connection procedure in a third embodiment.

In the first embodiment, the audio connection is terminated by the control apparatus 20 in the case where the call arrives, but the audio connection may also be terminated from the side of the robot 10. FIG. 5 is a connection sequence diagram of the robot 10 and the control apparatus 20 in a second embodiment.

In the second embodiment, in the case where a call arrives, an incoming call notification (a first notification in the present invention) is transmitted to the robot 10 from the control apparatus 20 (Step S141). The notification is automatically transmitted by middleware in the case where the HFP connection is performed, but the incoming call notification may be transmitted via a profile other than HFP. In the case where the robot 10 detects the incoming call notification, the robot 10 terminates the audio connection (Step S143).

Thus, the termination and the re-establishment of the audio connection may be performed mainly by the robot 10. By transmitting the incoming call notification to the robot 10, the robot 10 can know the arrival of the incoming call at the control apparatus 20, and the route of the voice can be smoothly switched.

Third Embodiment

In the second embodiment, the control section 22 detects the end of the call, and transmits the call end notification to the robot 10. However, in the case where the control apparatus 20 cannot detect that the audio connection is terminated due to the incoming call, there are cases where the control apparatus 20 cannot determine whether or not the call end notification is to be transmitted correctly.

To cope with this, in a third embodiment, when the incoming call notification is transmitted in Step S141, the robot 10 transmits a rejection response (Step S142), and then terminates the audio connection.

Note that the rejection response may be a refusal response conforming to the bluetooth (or HFP) standard (e.g. call rejection).

In the case where the call is ended and the control apparatus 20 has received the rejection response most recently, the control apparatus 20 transmits the call end notification.

According to the third embodiment, it becomes possible for the control apparatus 20 to know the termination of the audio connection caused by the incoming call.

Modification

Each of the above-described embodiments is only exemplary, and the present invention can be appropriately modified and implemented without departing from the gist thereof.

For example, the server apparatus 30 performs the voice recognition in the description of the embodiments, but the control apparatus 20 may include a unit configured to perform the voice recognition. In addition, the server apparatus 30 generates the response sentence in the description of the embodiments, but the control apparatus 20 may generate the response sentence.

Further, in the description of the embodiments, the case where the incoming call arrives at the control apparatus 20 is described by way of example, but the audio connection may be switched by a trigger other than the triggers related to the voice call (the arrival of the call and the end of the call). For example, in the case where an application that needs the voice input and output requests the voice input and output, the audio connection with the robot 10 may be terminated. In this case, the audio connection may be re-established in the case where the voice input and output in the application becomes unnecessary. In addition, such an application may be executed in the control section 22.

What is claimed is:

1. A voice interaction system comprising:
   an information processing apparatus having a first voice input/output device configured to input sound and output sound; and
   a robot that includes a voice interface apparatus having a second voice input/output device configured to input sound and output sound, and connected to the information processing apparatus by audio connection via short-range wireless communication, wherein
   the information processing apparatus includes:
   a voice input/output unit configured to perform voice input and output by using the first voice input/output device or the second voice input/output device;
   an interaction unit configured to perform voice interaction between a user and the robot; and
   a process unit having a communication section configured to perform a voice call between the user and a third party via a communication network, by using the voice input and output, and
   the voice input/output unit switches a device used for the voice input and output to the first voice input/output device in a case where, due to an incoming communication from the third party, the process unit is brought into a first state in which the voice input and output via the communication section is required to perform the voice call between the user and the third party at a time at which the voice interaction between the user and the robot is being performed by using the second voice input/output device.

2. The voice interaction system according to claim 1, wherein
   the communication section performs the voice call via a wireless communication network.

3. The voice interaction system according to claim 1, wherein
   the information processing apparatus and the voice interface apparatus are connected to each other by using a voice profile based on a Bluetooth standard.

4. The voice interaction system according to claim 3, wherein
   the process unit transmits a first notification to the voice interface apparatus in the case where the process unit is brought into the first state, and
   the voice interface apparatus terminates the audio connection with the information processing apparatus in a case where the voice interface apparatus receives the first notification.

5. The voice interaction system according to claim 1, wherein
   the process unit transmits a second notification to the voice interface apparatus in a case where the voice input and output becomes unnecessary, and
   the voice interface apparatus re-establishes the audio connection with the information processing apparatus in a case where the voice interface apparatus receives the second notification.

6. The voice interaction system according to claim 3, wherein
   the process unit transmits a first notification to the voice interface apparatus in the case where the process unit is brought into the first state, and
   the voice interface apparatus transmits a rejection response to the process unit, and then terminates the audio connection with the information processing apparatus in a case where the voice interface apparatus receives the first notification.

7. The voice interaction system according to claim 6, wherein
   when the process unit receives the rejection response and the audio connection is terminated, the process unit re-establishes the audio connection by transmitting a second notification to the voice interface apparatus in a case where the voice input and output becomes unnecessary.

8. An information processing apparatus comprising:
   a first voice input/output device configured to input sound and output sound;
   a voice input/output unit configured to perform voice input and output by using the first voice input/output device or a second voice input/output device of a voice interface apparatus of a robot connected to the information processing apparatus via short-range wireless communication, the second input/output device of the robot being configured to input sound and output sound;
   an interaction unit configured to perform voice interaction between a user and the robot; and
   a process unit having a communication section configured to perform a voice call between the user and a third party via a communication network, by using the voice input and output, wherein
   the voice input/output unit switches a device used for the voice input and output to the first voice input/output device in a case where, due to an incoming communication from the third party, the process unit is brought into a first state in which the voice input and output via the communication section is required to perform the voice call between the user and the third party at a time at which the voice interaction between the user and the robot is being performed by using the second voice input/output device.

9. The voice interaction system according to claim 1, wherein
   the interaction unit performs the voice interaction with the user by sending a voice response that was generated in response to a voice utterance using voice recognition and response sentence generation, the voice utterance and the voice response being received and sent through one of the first and second voice input/output devices.

10. The information processing apparatus according to claim 8, wherein
    the interaction unit performs the voice interaction with the user by sending a voice response that was generated in response to a voice utterance using voice recognition and response sentence generation, the voice utterance and the voice response being received and sent through one of the first and second voice input/output devices.

* * * * *